United States Patent
Gharabally et al.

(10) Patent No.: US 7,853,253 B2
(45) Date of Patent: Dec. 14, 2010

(54) SYSTEM AND METHOD OF REGULATING DATA TRAFFIC BETWEEN A CLIENT DEVICE AND A SERVER

(75) Inventors: Sam Gharabally, San Francisco, CA (US); Michael Chu, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 355 days.

(21) Appl. No.: 12/171,241

(22) Filed: Jul. 10, 2008

(65) Prior Publication Data
US 2010/0011052 A1  Jan. 14, 2010

(51) Int. Cl.
*H04Q 7/20* (2006.01)
(52) U.S. Cl. .............. 455/426.1; 455/420; 370/328; 709/203
(58) Field of Classification Search ............ 455/418, 455/420, 426.1; 370/328; 709/203
See application file for complete search history.

(56) References Cited

U.S. PATENT DOCUMENTS

| | | | |
|---|---|---|---|
| 7,403,537 B2 * | 7/2008 | Allison et al. | 370/426 |
| 7,640,015 B2 * | 12/2009 | Connelly et al. | 455/423 |
| 7,668,534 B2 * | 2/2010 | Connelly | 455/412.1 |
| 7,697,536 B2 * | 4/2010 | Basso et al. | 370/394 |
| 2001/0049790 A1 | 12/2001 | Faccin et al. | |
| 2002/0143952 A1 | 10/2002 | Sugiarto et al. | |
| 2004/0053616 A1 * | 3/2004 | Overtoom et al. | 455/445 |
| 2006/0135179 A1 | 6/2006 | Aaltonen | |
| 2006/0159127 A1 | 7/2006 | Childress et al. | |
| 2007/0053327 A1 * | 3/2007 | Park | 370/335 |

FOREIGN PATENT DOCUMENTS

| | | |
|---|---|---|
| EP | 1 599 020 A2 | 11/2005 |
| EP | 1 906 627 A1 | 4/2008 |

* cited by examiner

*Primary Examiner*—Nhan Le
(74) *Attorney, Agent, or Firm*—Jürg Domenig; Novak Druce + Quigg LLP

(57) ABSTRACT

A system, method, and computer-readable medium for regulating data traffic between a client device and a server. The system determines whether a transmission of a data file is allowable based on pre-defined criteria. The system provides an indication of whether the transmission is allowable and under what conditions the transmission would be allowable. If the transmission of a data file is requested and the transmission is not allowable, a message is sent from the server to the client device that first pre-defined criteria are not met and the message indicates that the transmission of the data file will be allowed when second pre-defined criteria are met.

18 Claims, 6 Drawing Sheets

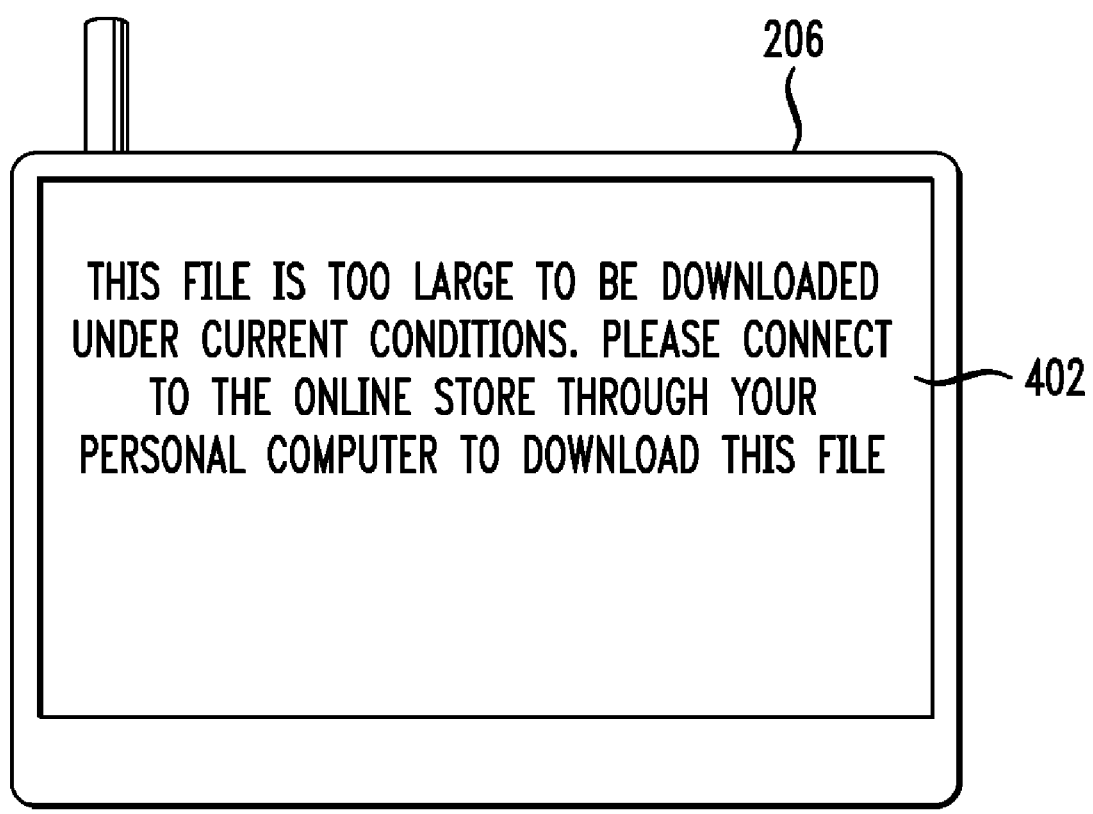

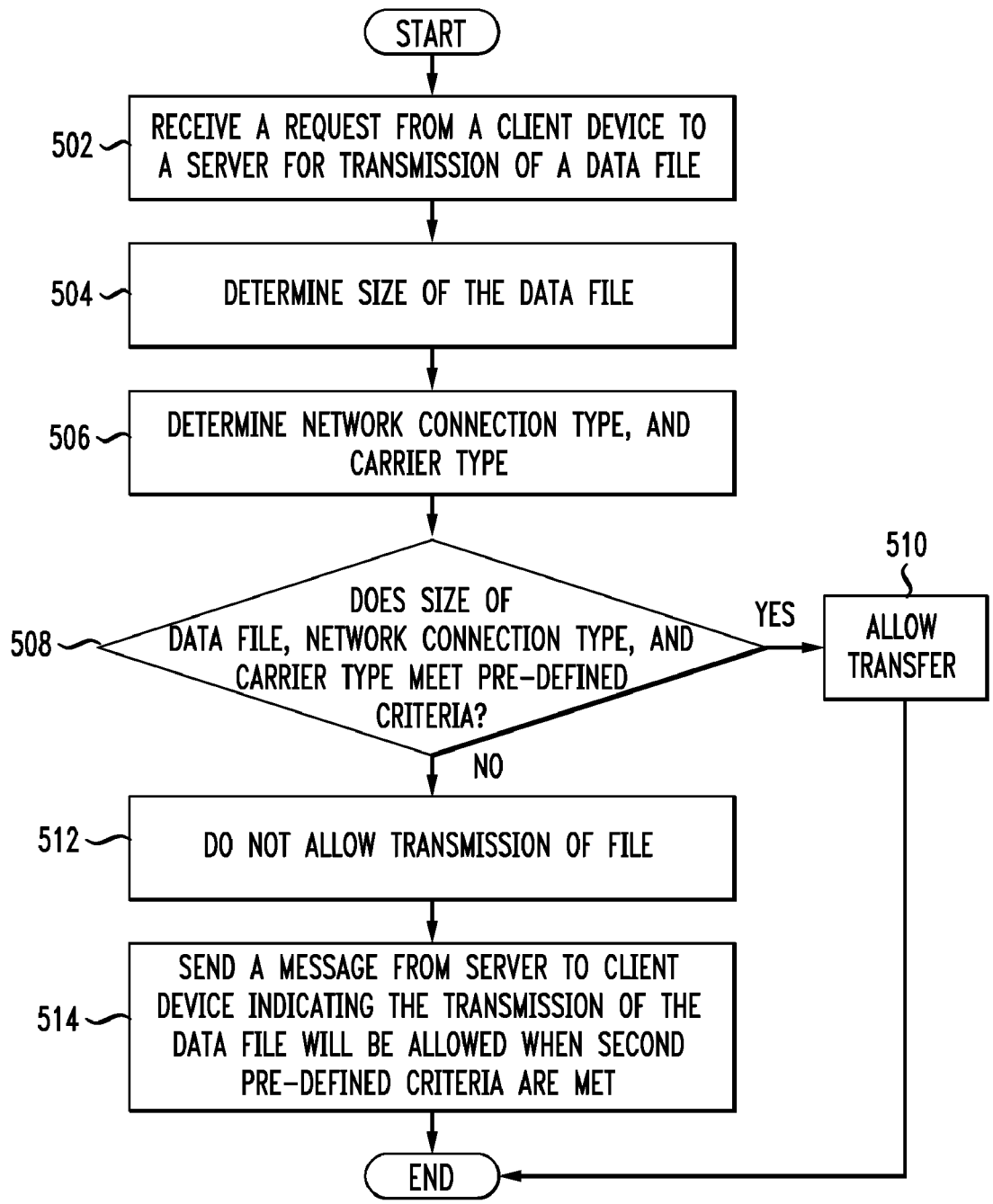

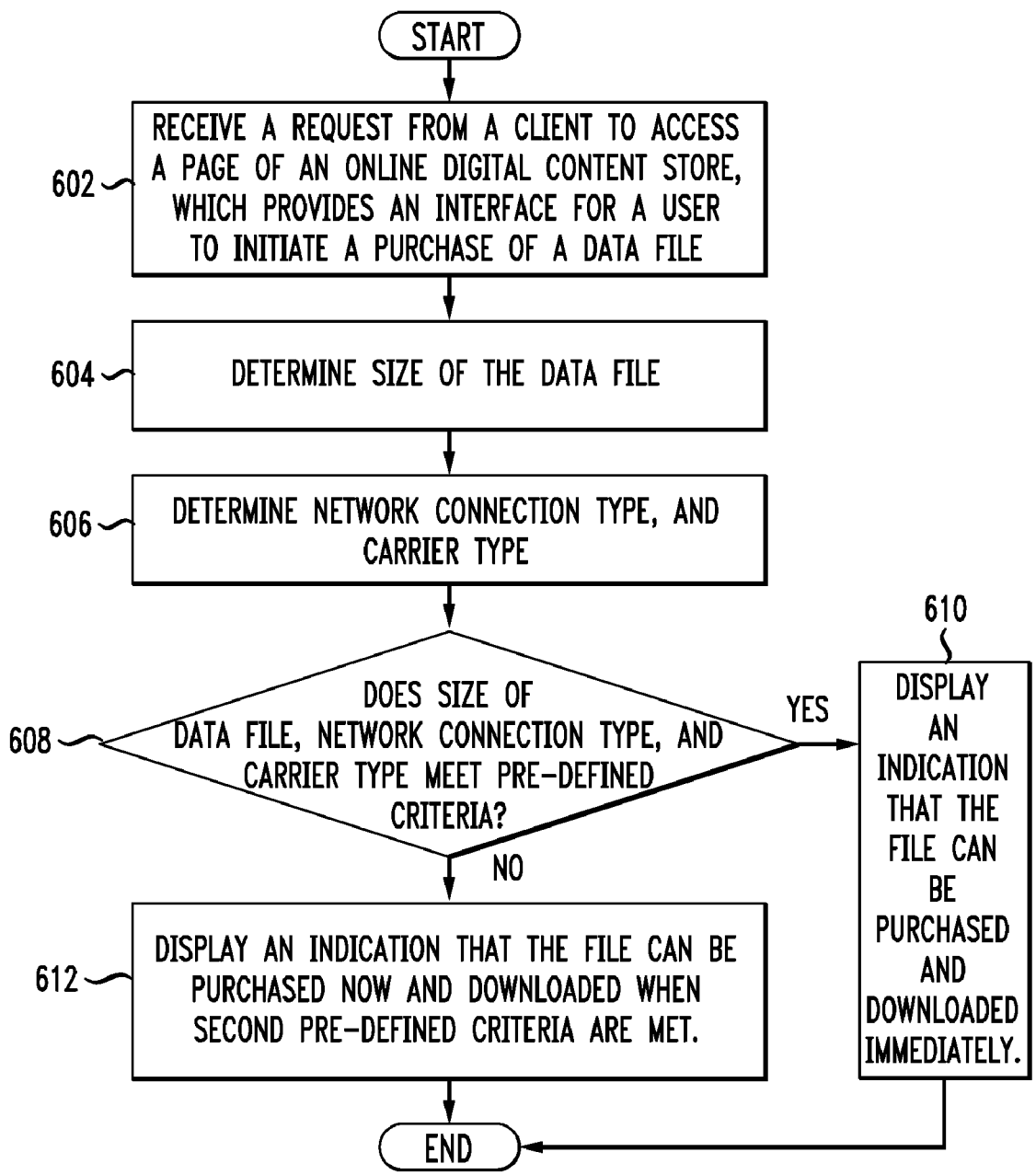

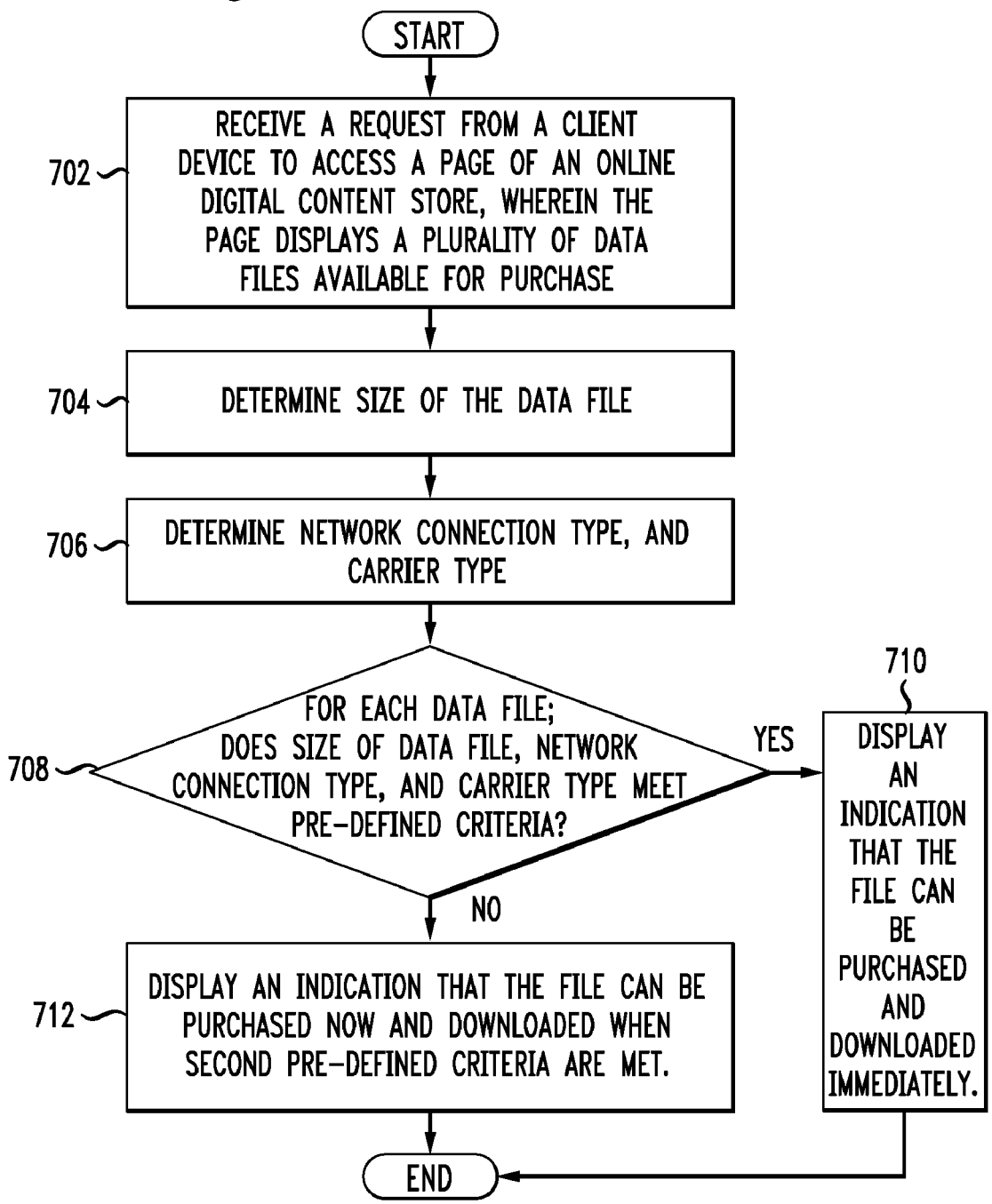

SYSTEM AND METHOD OF REGULATING DATA TRAFFIC BETWEEN A CLIENT DEVICE AND A SERVER

BACKGROUND OF THE INVENTION

1. Field of the Invention

Disclosed are systems and methods for regulating data traffic, and more particularly to regulating data traffic between a client device and server based on pre-defined criteria.

2. Introduction

Many online digital content stores exist that allow a user to pay for digital content and then immediately download the purchased content. For example, a user may pay for and instantly download an .mp3 audio file of their favorite artist. Other types of digital content that a user may pay for and download from an online digital content store include video data of television shows and movies, pictures, games, and other applications. Any type of content that can be expressed in digital form may be available for purchase in such an online store. One example of such a store is the iTunes online store by Apple Inc. Initially, most users accessed the online store by a personal computer, such as a desktop or laptop computer. Many users access such online digital content stores via computers connected to the Internet by broadband or dial-up connections. However, any method of connecting a personal computer to the Internet would work. Typically, when a user connects through a personal computer to an online digital content store, the user pays for the content and then immediately downloads the content.

Technological advancements have now made it possible for users to access online digital content stores with devices other than personal computers. For example, a user may access an online digital content store with a smart phone device or a personal digital assistant (PDA). A typical smart phone allows a user to make and receive telephone calls, as well as send and receive email and text messages, install and run software from first and third parties, access the Internet, etc. Smart phones are essentially portable, wireless personal computers with limited, but increasingly powerful, capabilities. Smart phone devices may utilize the network from their carrier for data transmission, or alternatively smart phone devices with appropriate hardware may access available WiFi, WiMAX, or bluetooth networks. Carrier networks include, for example, EDGE, 2G, and 3G networks. Unregulated requests for data files on most carrier networks may result in overloading and over-taxing the capabilities of a given network, or even completely crashing a network. This can lead to loss of service for customers as well as costly repair and support expenses for a carrier.

Since most online digital content stores allow a user to pay for digital content and then immediately download the purchased content, regulation of data traffic only by preventing the transmission of requested data files could lead to customer dissatisfaction. Thus, a need exists not only to prevent certain data file transmissions, but also to regulate data traffic by guiding customers to data files that can be transmitted immediately.

Accordingly, what is needed in the art is a system and method for regulating data traffic between a client device and a server.

SUMMARY

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

The present disclosure addresses the need in the art. The system and method preferably prevents the transmission of a requested data file, if at least one characteristic of the data file, such as the size of the data file, the network connection type, and/or the carrier connection type, fail to meet first pre-defined criteria. Upon prevention of a data file transmission, a message can be sent from the server to the client device, indicating that the transmission of the data file will be allowed when second pre-defined criteria are met. The pre-defined criteria may be updated on a variety of factors. For example, the criteria could be updated on each request, on each new session or on a particular frequency interval or based on other factors. Conditions for the criteria may be updated on every new launch of an application and store on a device.

This invention disclosure describes a system, method, and computer-readable medium for regulating data traffic between a client device and a server. The system determines whether to allow transmission of a requested data file based on pre-defined criteria. If the requested data file transmission is not allowed, a message is sent from the server to the client device that first pre-defined criteria are not met and the message indicates that the transmission of the data file will be allowed when second pre-defined criteria are met.

The method is illustrative of the invention and the principles associated with the method are applicable to the system and computer readable medium. A method of data traffic regulation is disclosed. The method includes receiving a request from a client device to a server for transmission of a data file. The method next includes determining at least one characteristic of the data file, preferably a size of the data file. Next, the method includes determining a network connection type and carrier type. Preferably, the connection type is selected from the group consisting of EDGE, 2G, 3G, LTE, WiMax, WiBro, and WiFi networks. The connection type can be extended to carrier networks currently in development or yet to be developed. The method includes not allowing the transmission of the data file if the at least one characteristic of the data file, the network connection type, and the carrier connection type do not meet first pre-defined criteria. Preferably, the first pre-defined criteria include a maximum file size transfer limit. This size limit may be set by a carrier or the application store from which a user purchased the file. If a data file transmission is not allowed the method includes sending a message from the server to the client device, indicating that the transmission of the data file will be allowed when second pre-defined criteria are met.

Wireless service providers for smartphones to set pre-defined criteria not to allow certain requests for a data file from an online content store, and to indicate that the file transfer will be allowed if second pre-defined criteria are met. Preferably, the second pre-defined criteria include a requirement that the connection type is a WiFi network connection. The second pre-defined criteria may also require a user to connect to the online digital store through a personal computer connected to the Internet to receive the purchased data file. This is not an exhaustive list.

Other versions of the method for regulating data traffic between a client device and a server include receiving a request from a client device to access information related to at least one data file. Upon receiving such a request for information related to at least one data file, the method further includes determining at least one characteristic of the data file, preferably a size for the at least one data file, determining a network connection type, and determining a carrier type. Next, the method involves determining whether the at least one data file can be transmitted immediately based on whether the at least one characteristic of the at least one data file, the network connection type, and the carrier connection type meet first pre-defined criteria. Finally, the method involves providing an indication, which specifies whether the at least one data file can be transmitted immediately.

In some instances, it is preferable that the system and method for regulating data traffic include receiving a request from a client device to generate a list of data files available for immediate download. Such systems and methods further include determining a network connection type and a carrier type and identifying at least one data file available for immediate download. For example, the data file can be selected from a database of all data files available for purchase. The identification of the at least one data file available for immediate download is based on whether at least one characteristic of the data file, preferably a size of the at least one data file; the network connection type; and the carrier connection type meet first pre-defined criteria. Finally, the system and method include providing a list of data files available for immediate download, wherein the list includes a reference to the at least one data file.

Any network that does not allow the transmission of a requested data file, if at least one characteristic of the data file, the network connection type, and the carrier connection type do not meet first pre-defined criteria and sends a message to the client device indicating that the transmission of the data file will be allowed when second pre-defined criteria are met may benefit from the disclosed system and method of data traffic regulation.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only exemplary embodiments of the invention and are not therefore to be considered to be limiting of its scope, the invention will be described and explained with additional specificity and detail through the use of the accompanying drawings in which:

FIG. 4 illustrates a client device displaying a message from the sever, indicating that the requested data file transmission will be allowed when second pre-defined criteria are met;

FIG. 5 illustrates an example decision tree, in which a transfer is allowed or disallowed;

FIG. 6 illustrates an example decision tree, in which a data file is indicated as being available for download now or when second pre-defined criteria are met; and FIG. 7 illustrates an example decision tree, in which a plurality of data files are each indicated as being available for download now or when second pre-defined criteria are met.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
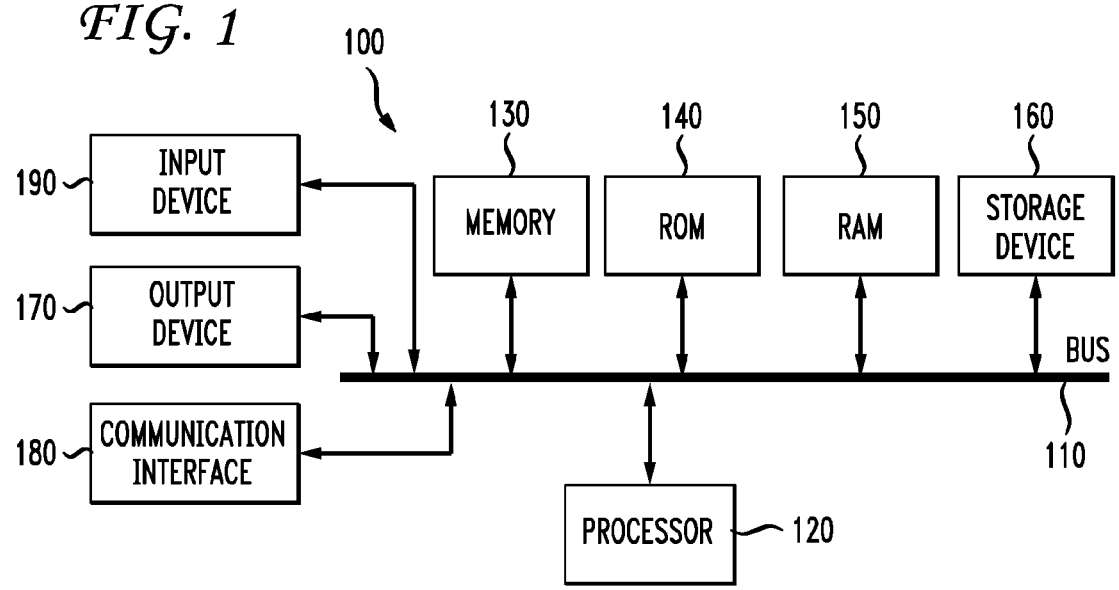
FIG. 1 illustrates an example system embodiment.

Prior to discussing the details of the method according the invention more fully, the disclosure next presents the basic hardware components associated with the system embodiment of the invention. With reference to FIG. 1, an exemplary system includes a general-purpose computing device 100, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the invention may operate on a computing device with more than one CPU 120 or on a group or cluster of computing devices networked together to provide greater processing capability. The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch-sensitive screen for gesture or graphical input, keyboard, mouse, motion input, speech and so forth. The device output 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on the invention operating on any particular hardware arrangement and therefore the basic features here may easily be substituted for improved hardware or firmware arrangements as they are developed.

For clarity of explanation, the illustrative system embodiment is presented as comprising individual functional blocks (including functional blocks labeled as a "processor"). The functions these blocks represent may be provided through the use of either shared or dedicated hardware, including, but not limited to, hardware capable of executing software. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

Having disclosed the basic components of the system embodiment, the disclosure now returns to the details of the method.

Figure 2:
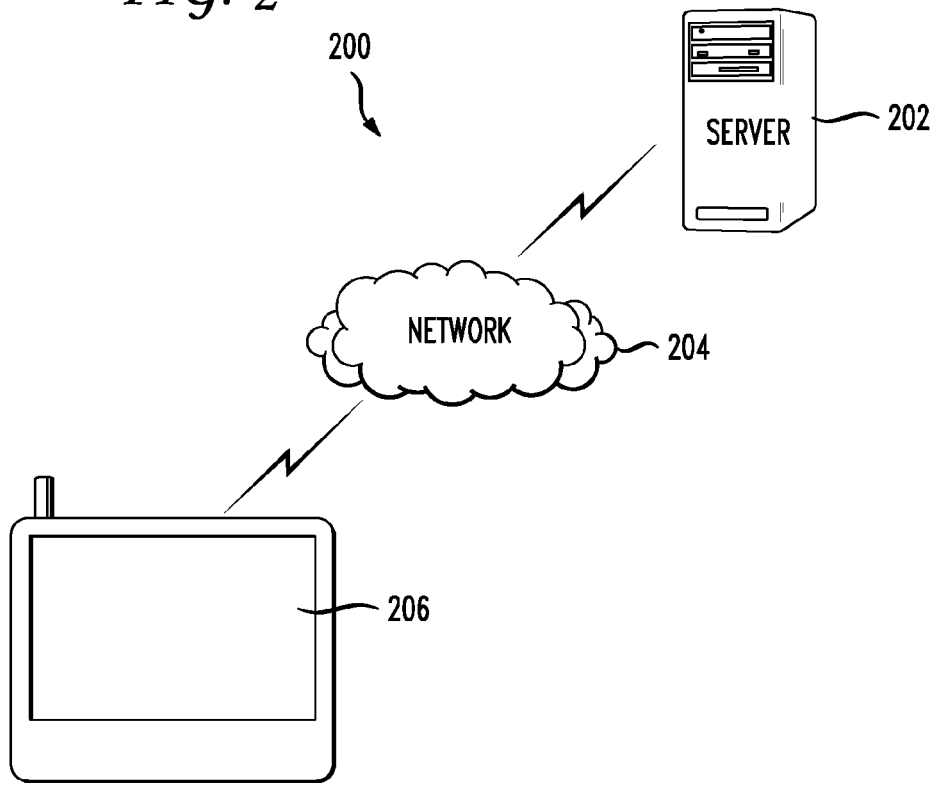
FIG. 2 illustrates a connection between a client device and a server via a wireless network.

In general, the method regulates data traffic between a client device and a server. FIG. 2 illustrates a connection (200) between a client device (206) and a server (202) via a wireless network (204). While FIG. 2 demonstrates a single client device, many heterogeneous client devices can interface with one or more servers using a variety of wireless networks. For example, different types of smart phones can interface using Wi-Fi, EDGE, 3G, or other wireless protocols with an online storefront operated by a cluster of servers.

As illustrated in FIG. 5, versions of the method include receiving a request from a client device to a server for transmission of a data file (502). These versions further include determining at least one characteristic of the data file, in this case a size of the data file (504), and determining the network connection type and the carrier type (506). The size of the data file refers to a measure of computer processor storage and real and virtual memory, for example, a megabyte (MB). Examples of network connection types include Edge, 2G, 3G, LTE, WiMax, WiBRO, and WiFi. The term, "carrier type," or "carrier connection type," typically refers to a network service provider in a particular region or for a specific client device, for example, AT&T, Verizon, Sprint, Nextel, Cingular, Vodafone, etc. Carriers often negotiate contractual limitations with server operators and/or providers of client devices with regard to data traffic to be transferred via a network. These contractual limitations often specify a limit on the size of data file transfers for a particular network connection type.

According to the present invention, first criteria are pre-defined to facilitate a determination of whether the transmission of a particular data file should be allowed. For example, if carrier XYZ disallows or imposes extra fees for transferring data files of greater than 10 MB over 2G networks, first criteria are pre-defined to disallow requests for such data transfers. The first criteria can also be pre-defined to disallow the transmission of data files based at least one characteristic of the data file, for example, on the data file's content. More specifically, the transmission of copyrighted material or the transmission of obscene material might be disallowed. The content type can be determined in any manner. One way is to examine the metadata associated with the data file. Another way is to look to the original source or provider of the data file.

In one aspect, the pre-defined criteria can be updated on each request, on each new session or on a frequency interval. For example, each time a new launch of an application occurs, new pre-defined criteria can be established. Other factors may also come into play with regards to modifying or redefining the pre-defined criteria.

Second criteria are also pre-defined, to specify a condition or a combination of conditions under which the transfer would be allowed. For example, second pre-defined criteria can require a WiFi connection or a particular carrier type to allow the transmission of the data file, or the second pre-defined criteria can require the customer to connect to the server through a personal computer through a TCP/IP connection.

Still referring to FIG. 5, the method according to the present invention includes determining whether at least one characteristic of the data file, in this case the size of the data file, the network connection type, and the carrier type meet first pre-defined criteria (508). If the first pre-defined criteria are met, then the method includes allowing the transfer (510). If the first pre-defined criteria are not met, then the method not allowing the transmission or download of the data file (512). When the transmission of a data file is disallowed because the at least one characteristic of the data file, in this case the size of the data file, the network connection type, and the carrier type do not meet first pre-defined criteria, the method preferably includes a step of sending a message from the server to the client device (514). This message indicates that the transmission of the data file will be allowed when second pre-defined criteria are met. For example, FIG. 4 illustrates a client device 206 displaying a message 402 from the server, indicating that the requested data file transmission will be allowed when second pre-defined criteria are met. This message need not be displayed in the form of text. The message could be sent from the server to the client device and delivered to the user in any visual, auditory, and/or kinesthetic form, for example, an audible tone, a symbolic onscreen representation, a vibration, or a telephone call.

Other versions of the present invention provide a system and method for regulating data traffic between a client device and a server by directing customers to data files that can be transmitted immediately. Such systems and methods include receiving a request from a client device to access information related to at least one data file. For example, the system and method can receive a request from a client device to access a page of an online digital content store. The page can provide an interface for a user to initiate a purchase of a data file, or the page can display a plurality of data files available for purchase. The page can be static or dynamically generated.

If the page provides an interface for a user to initiate a purchase of a particular data file, the system and method further includes determining at least one characteristic of the data file, preferably a size of the data file, determining a network connection type and carrier type, determining whether the data file can be transmitted based on whether the at least one characteristic of the data file, preferably the size of the data file, the network connection type, and the carrier connection type meet first pre-defined criteria, and providing an indication. Preferably, the indication specifies whether the data file can be transmitted immediately. If the at least one characteristic of the data file, preferably the size of the data file, network connection type, and carrier connection type do not meet the first pre-defined criteria, the indication can further specify that the transmission of the data file will be allowed when second pre-defined criteria are met.

If the page displays a plurality of data files available for purchase then the above approach can be applied to each respective data file.

Figure 3A:
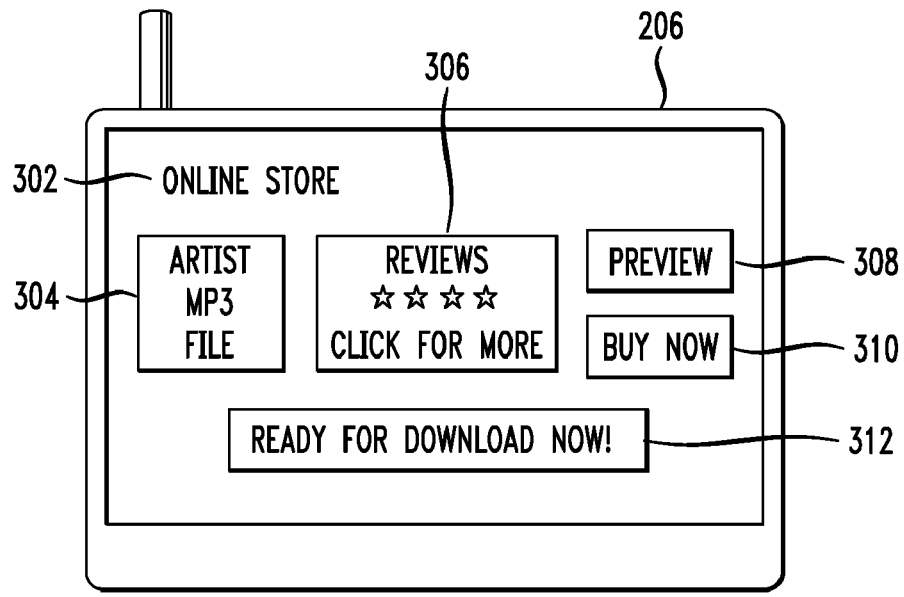
FIG. 3A illustrates a client device displaying a page of an online digital content store, which provides an interface for a user to initiate a purchase of a particular data file.

FIG. 3A illustrates a client device 206 displaying a page 302 of an online digital content store. The page 302 displays information related to a data file, including, for example, general information 304, and review information 306. Page 302 may also provide a preview button 308 for allowing customers to preview the data file, and/or a purchase initiation button 310, to allow customers to initiate a financial transaction to acquire a license to the data file or purchase the file. Finally, page 302 provides an indication 312. In one aspect, the file is a software program or media file that the user can buy, license or rent.

Figure 3B:
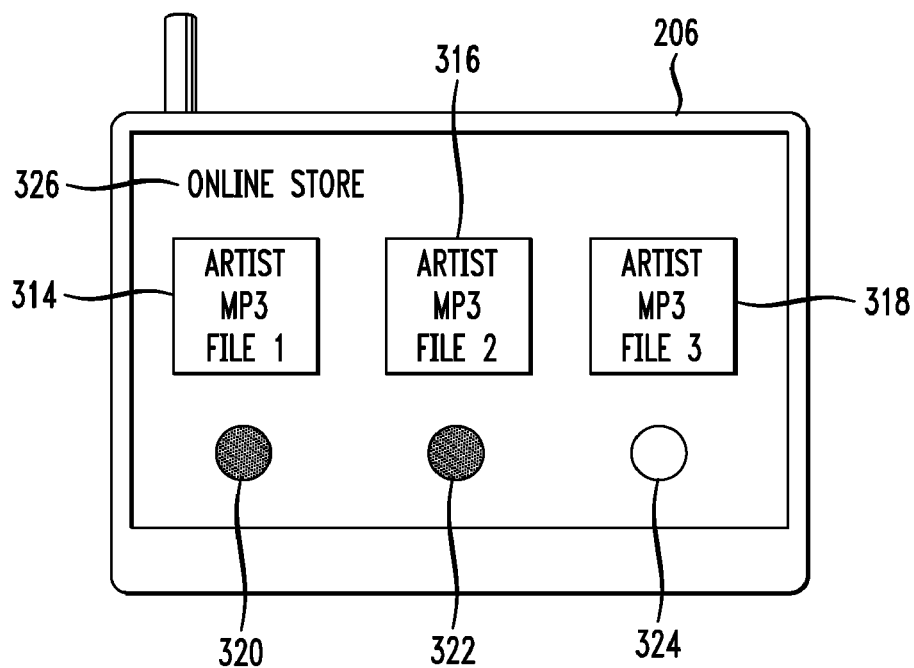
FIG. 3B illustrates a client device displaying a page of an online digital content store, which displays a plurality of data files available for purchase.

FIG. 3B illustrates a client device 206 displaying a page 326 of an online digital content store. The page 326 displays information related to a plurality of data files, including, for example, general information 314 related to a first data file, general information 316, related to a second data file, and general information 318, related to a third data file. Finally, page 326 provides an indication 320 related to the first data file, an indication 322 related to the second data file, and an indication 324 related to the third data file.

Indication 312 in FIG. 3A and indications 320, 322, and 324 in FIG. 3B specify whether the data file to which the indication relates is ready for immediate download or transmission. The indications need not be in the form of text, and can be presented in any visual, auditory or kinesthetic form, for example, an audible tone, a symbolic onscreen representation, a vibration, or a telephone call. The indications need not be in the form of a separate display item on the page, and may be provided by modifying another displayed item. For example, indication 312 could be provided by changing the appearance of purchase initiation button 310, or by providing auditory and/or kinesthetic feedback when a user touches or otherwise engages any portion of page 312. If the particular data file to which an indication relates is not available for immediate download, the indication preferably specifies that the transmission of the data file will be allowed when second pre-defined criteria are met. Providing such indications allows for the regulation of data traffic between a client device and a server by guiding customers to data files that are available for immediate transfer or download.

When a user requests access to a page of an online digital content store providing an interface for a user to initiate a purchase of a data file, like page 302, in FIG. 3A, the user is requesting information related to a particular data file. Similarly, when a user requests access to a page of an online digital content store displaying a plurality of data files, like page 326, in FIG. 3B, the user is requesting information related to a plurality of data files. Versions of the method include receiving a request from a client device to access information related to at least one data file. Two specific embodiments of this step are illustrated in the figures. FIG. 6 one method embodiment. The method includes receiving a request from a client to access a page of an online digital content store which provides an interface for a user to initiate a purchase of a data file. In FIG. 7, the method includes a similar step of receiving a request from a client device to access a page of an online digital content store, wherein the page displays a plurality of data files available for purchase (702). After receiving a request from a client device to access information related to at least one data file, versions of the method further include determining at least one characteristic of the data file (604) (704), in this case a size of the at least one data file. Next, the method includes determining a network connection type and a carrier type (606) (706). The method further includes determining whether the at least one data file can be transmitted immediately based on whether the at least one characteristic of the data file, in this case the size of the at least on data file, the network connection type, and the carrier connection type meet first pre-defined criteria (608) (708). Finally, an indication is provided based on whether the at least one characteristic of the data file, in this case the size of the at least on data file, the network connection type, and the carrier connection type meet first pre-defined criteria. If the first pre-defined criteria are met, then the indication specifies that the at least one file can be transmitted immediately (612) (712). If the first pre-defined criteria are not met, then, as illustrated by box (612) in FIG. 6, and by box (712) in FIG. 7, the indication specifies that the at least one file cannot be transmitted immediately. Such a negative indication is preferably coupled with an indication that the file can be purchased immediately, and downloaded or transmitted when second pre-defined criteria are met. The indication can include a list of multiple states which would satisfy one or more of the second pre-defined criteria.

It is particularly preferred that the method of data traffic regulation immediately completes any financial transactions associated with a request for transmission of a data file, regardless of whether the first or second pre-defined criteria are met. For example, in the purchase of digital content from a portable wireless device, the system and method preferably includes completing a financial transaction, wherein a payment approval message is sent from the client device to the server. The financial transaction can be completed before or after determining the at least one characteristic of the data file, preferably the size of the data file, the network connection type, and the carrier type. It is preferable, however, that the financial transaction is completed after determining whether the at least one characteristic of the data file, the network connection type, and the carrier type meet the first pre-defined criteria. Completing the financial transaction after this determination, allows the message sent from the server to the client device to include not only an indication that the transmission of the data file will be allowed when the second pre-defined criteria are met, but also an indication that payment has been received for the data file.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. A "tangible" computer-readable medium expressly excludes software per se (not stored on a tangible medium) and a wireless, air interface. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions.

Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps. Program modules may also comprise any tangible computer-readable medium in connection with the various hardware computer components disclosed herein, when operating to perform a particular function based on the instructions of the program contained in the medium.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (by hardwired links, wireless links, or a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. Accordingly, the appended claims and their legal equivalents should only define the invention, rather than any specific examples given.

We claim:

1. A method for regulating data traffic between a client device and a server comprising:
   receiving a request from a client device to a server for transmission of a data file;
   determining at least one characteristic of the data file;
   determining a network connection type and carrier type;
   not allowing the transmission of the data file if the at least one characteristic of the data file, network connection type, and carrier connection type do not meet first pre-defined criteria; and
   sending a message from the server to the client device if the at least one characteristic of the data file, network connection type, and carrier connection type do not meet the first pre-defined criteria wherein the message indicates that the transmission of the data file will be allowed when second pre-defined criteria are met.

2. The method of claim 1, wherein the at least one characteristic of the data file is a size of the data file.

3. The method of claim 1, wherein the connection type is selected from the group consisting of Edge, 2G, 3G, LTE, WiMAX, WiBRO, and WiFi networks.

4. The method of claim 1, wherein the first pre-defined criteria includes a maximum data file size transfer limit.

5. The method of claim 1, further including completing a financial transaction wherein a payment approval message is sent from the client device to the server and the message from the server to the client device indicates that the data file has been paid for and will be available for download when the second pre-defined criteria are met.

6. The method of claim 1, wherein the second pre-defined criteria includes a WiFi network connection.

7. The method of claim 1, wherein the message from the server to the client device indicates that the transmission of the data file will be allowed when a personal computer corresponding to the client device connects to the server though a TCP/IP connection.

8. A method for regulating data traffic between a client device and a server comprising:
   receiving a request from a client device to access information related to at least one data file;
   determining at least one characteristic for the at least one data file;
   determining a network connection type;
   determining a carrier type;
   determining whether the at least one data file can be transmitted immediately based on whether the at least one characteristic of the at least one data file, the network connection type, and the carrier connection type meet first pre-defined criteria; and
   providing an indication specifying whether the at least one data file can be transmitted immediately.

9. The method of claim 8, wherein if the at least one characteristic of the at least one data file, the network connection type, and the carrier connection type do not meet the first pre-defined criteria, the indication further specifies that the transmission of the data file will be allowed when second pre-defined criteria are met.

10. A non-transitory computer readable medium storing in for controlling instructions executable by a processor for controlling a computing device to regulate data traffic between a client device and a server, the instructions comprising:
    receiving a request from a client device to a server for transmission of a data file;
    determining at least one characteristic of the data file;
    determining a network connection type and carrier type;
    not allowing the transmission of the data file if the at least one characteristic of the data file, network connection type, and carrier connection type do not meet first pre-defined criteria; and
    sending a message from the server to the client device if the at least one characteristic of the data file, network connection type, and carrier connection type do not meet the first pre-defined criteria wherein the message indicates that the transmission of the data file will be allowed when second pre-defined criteria are met.

11. The computer readable medium of claim 10, wherein the at least one characteristic of the data file is a size of the data file.

12. The computer readable medium of claim 10, wherein the connection type is selected from the group consisting of Edge, 2G, 3G, LTE, WiMAX, WiBRO, and WiFi networks.

13. The computer readable medium of claim 10, wherein the first pre-defined criteria includes a maximum data file size transfer limit.

14. The computer readable medium of claim 10, wherein the instructions further include completing a financial transaction wherein a payment approval message is sent from the client device to the server and the message from the server to the client device indicates that the data file has been paid for and will be available for download when the second pre-defined criteria are met.

15. The computer readable medium of claim 10, wherein the second pre-defined criteria includes a WiFi network connection.

16. The computer readable medium of claim 10, wherein the message from the server to the client device indicates that the transmission of the data file will be allowed when a personal computer corresponding to the client device connects to the server though a TCP/IP connection.

17. A non-transitory computer readable medium storing instructions executable by a processor for controlling a computing device to regulate data traffic between a client device and a server, the instructions comprising:

receiving a request from a client device to access information related to at least one data file;

determining at least one characteristic for the at least one data file;

determining a network connection type;

determining a carrier type;

determining whether the at least one data file can be transmitted immediately based on whether the at least one characteristic of the at least one data file, the network connection type, and the carrier connection type meet first pre-defined criteria; and providing an indication specifying whether the at least one data file can be transmitted immediately.

18. The computer readable medium of claim 17, wherein if the at least one characteristic of the at least one data file, the network connection type, and the carrier connection type do not meet the first pre-defined criteria, the indication further specifies that the transmission of the data file will be allowed when second pre-defined criteria are met.

* * * * *